(12) United States Patent
Amin-Sanayei et al.

(10) Patent No.: US 10,707,492 B2
(45) Date of Patent: Jul. 7, 2020

(54) SOLVENT-FREE ELECTRODE FABRICATION

(71) Applicant: Arkema Inc., King of Prussia, PA (US)

(72) Inventors: Ramin Amin-Sanayei, Malvern, PA (US); Jason Pomante, Glen Mills, PA (US); Wensheng He, Wayne, PA (US)

(73) Assignee: Arkema Inc, King of Prussia, PA (US)

( * ) Notice: Subject to any disclaimer, the term of this patent is extended or adjusted under 35 U.S.C. 154(b) by 0 days.

(21) Appl. No.: 15/315,965

(22) PCT Filed: Jun. 3, 2015

(86) PCT No.: PCT/US2015/033881
§ 371 (c)(1),
(2) Date: Dec. 2, 2016

(87) PCT Pub. No.: WO2015/187769
PCT Pub. Date: Dec. 10, 2015

(65) Prior Publication Data
US 2017/0125815 A1 May 4, 2017

Related U.S. Application Data

(60) Provisional application No. 62/007,055, filed on Jun. 3, 2014.

(51) Int. Cl.
*H01M 4/62* (2006.01)
*H01M 4/139* (2010.01)
(Continued)

(52) U.S. Cl.
CPC ......... *H01M 4/623* (2013.01); *H01M 4/0404* (2013.01); *H01M 4/0416* (2013.01);
(Continued)

(58) Field of Classification Search
CPC .. H01M 4/623; H01M 4/0404; H01M 4/0416; H01M 4/139; H01M 10/0525; H01M 4/1393
(Continued)

(56) References Cited

U.S. PATENT DOCUMENTS 5,776,637 A 7/1998 Kashio et al.
6,171,726 B1 1/2001 Reichman et al.
(Continued)

FOREIGN PATENT DOCUMENTS

| JP | 200660193 A | 3/2006 |
| JP | 2010114030 A | 5/2010 |
| JP | 2013247050 A | 12/2013 |

*Primary Examiner* — Khanh T Nguyen
(74) *Attorney, Agent, or Firm* — Joanne Rossi

(57) ABSTRACT

The invention relates to an electrode formed by the blending of dry active powdery electrode forming materials with an aqueous binder dispersion, and the subsequent adhering of the wet binder/dry active powdery electrode-forming materials blend to an electroconductive substrate, resulting in an electrode. The aqueous binder is preferably a fluoropolymer, and more preferably polyvinylidene fluoride (PVDF). The hybrid process provides the good dispersion and small particle size of a wet process, with the energy savings and reduced environmental impact of a dry process. The resulting electrode is useful in energy-storage devices.

15 Claims, 5 Drawing Sheets

(51) Int. Cl.
    *H01M 4/04*         (2006.01)
    *H01M 10/0525*    (2010.01)
    *H01M 10/052*     (2010.01)

(52) U.S. Cl.
    CPC .......... *H01M 4/139* (2013.01); *H01M 4/622* (2013.01); *H01M 10/0525* (2013.01); *H01M 10/052* (2013.01)

(58) Field of Classification Search
    USPC .......................... 252/500; 429/232, 221, 483
    See application file for complete search history.

(56) References Cited

U.S. PATENT DOCUMENTS

| | | |
|---|---|---|
| 6,200,703 B1 | 3/2001 | Kashio et al. |
| 7,791,860 B2 | 9/2010 | Mitchell et al. |
| 7,791,861 B2 | 9/2010 | Zhong et al. |
| 8,072,734 B2 | 12/2011 | Zhong et al. |
| 8,591,601 B2 | 11/2013 | Zhong et al. |
| 2003/0215716 A1 | 11/2003 | Suzuki et al. |
| 2006/0139846 A1 | 6/2006 | Mori et al. |
| 2008/0020280 A1* | 1/2008 | Miura ................ H01M 4/0404 429/221 |
| 2010/0242806 A1* | 9/2010 | Droll .................... C04B 41/009 106/772 |
| 2010/0304270 A1* | 12/2010 | Amin-Sanayei .... H01M 4/0404 429/483 |
| 2011/0165318 A9 | 7/2011 | Zhong et al. |
| 2012/0015246 A1* | 1/2012 | Amin-Sanayei ....... H01G 11/30 429/217 |
| 2014/0234724 A1* | 8/2014 | Nakamura .......... H01M 4/1393 429/232 |
| 2015/0125755 A1 | 5/2015 | Ishii |

\* cited by examiner

SOLVENT-FREE ELECTRODE FABRICATION

This application claims benefit, under U.S.C. § 119 or § 365 of PCT Application Number PCT/US2015/033881, filed Jun. 3, 2015; and U.S. Provisional Application No. 62/007,055, filed Jun. 3, 2014; said applications incorporated herein by reference.

FIELD OF THE INVENTION

The invention relates to an electrode formed by the blending of dry active powdery electrode forming materials with an aqueous binder dispersion, and the subsequent adhering of the wet binder/dry active powdery electrode-forming materials blend to an electroconductive substrate, resulting in an electrode. The aqueous binder is preferably a fluoropolymer, and more preferably polyvinylidene fluoride (PVDF). The hybrid process provides the good dispersion and small particle size of a wet process, with the energy savings and reduced environmental impact of a dry process. The resulting electrode is useful in energy-storage devices.

BACKGROUND OF THE INVENTION

Electrodes are used in energy storing devices, including but not limited to, batteries, capacitors, ultra-capacitors, non-aqueous-type secondary batteries and such.

Currently there are two primary means for producing electrodes: a "wet" method and a "dry" method. In the wet method, a polymeric binder in the form of a solvent solution or dispersion is blended with one or more active powdery electrode forming materials to form a slurry dispersion or paste. This dispersion or paste is then applied to one or both surfaces of an electroconductive substrate, and dried to form a coherent composite electrode layer. The electrode layer may then be calendered. This method is shown in U.S. Pat. Nos. 5,776,637 and 6,200,703, where a fluoropolymer binder is dissolved in NMP. An improvement on the solvent solution is the use of an aqueous fluoropolymer dispersion as the binder, as described in US 2010/0304270 and US 2012/0015246. Advantageously, in the aqueous dispersion process, the polymer binder stays as small discrete particles—and those particles bind the active electrode materials only at discrete points—resulting in an interconnectivity of the active electrode particles, rather than as the coating formed on the active particles from a polymer solution. Since most of the active electrode material is not covered by the binder, there is less insulation effect, less heat build-up, and better conductivity. Additionally, an aqueous binder provides environmental benefits over organic solvents, and less binder can be used since the dry active powdery electrode-forming materials are essentially spot-welded, rather than completely coated.

The second process for forming electrodes is by a dry process. In the dry process, a dry polymer powder is dry-blended with dry active powdery electrode-forming materials—often under high shear where the mixture is fibrillized—and the dry blend is either formed into a film which is adhered to an electroconductive substrate, or else the dry blend is applied directly to, and pressed onto the electroconductive substrate by means such as calendaring. The dry electrode process is described in U.S. Pat. Nos. 7,791,860, 7,791,861, 8,072,734, 8,591,601, and US 2011/0165318.

A problem with the wet method, is that a large amount of solvent must be evaporated—which has negative environmental effects, and also requires a lot of energy to remove.

A problem with the dry method is that dry particles of the binder polymer tend to agglomerate during the drying process or during storage, particularly if the binder particles are soft. The agglomerated polymer binder particles are difficult to distribute uniformly throughout the blend. This is especially an issue when low amounts of binder are desired to maximize performance, and also minimize cost.

There is a desire to obtain the small particle size and good distribution of the polymer binder, as found in an aqueous dispersion coating process, but with the advantages of reduced energy consumption of drying and little or no environmentally undesirable solvent waste, as found in the dry process.

Surprisingly, it has now been found that a hybrid process can provide advantages over both the wet and dry processes, leading to synergistic positive properties of the formed electrode. In the hybrid process, an aqueous dispersion of binder is added to dry active electrode-forming materials, that good distribution of small, discrete fluoropolymer binder particles occurs, and the water added with the dispersion is easily removed with heat applied during the electrode-forming process. Advantageously, the dispersion is more uniform, and the dispersed polymer particles do not agglomerate, providing the best of both processes.

Other advantages include: lower cost of manufacturing, energy saving, and better dispersion of the binder, which in turn could reduce binder usage.

SUMMARY OF THE INVENTION

The invention relates to a method for forming an energy storing device, comprising the steps of
a) forming an aqueous binder dispersion;
b) adding said binder dispersion to dry active powdery electrode-forming materials to form a uniform blend, and
c) applying said uniform blend to at least one surface of an electroconductive substrate to form an electrode.

The invention further relates to the electrode formed by the process, having uniform binder particle distribution, and having interconnectivity of the dry active powdery electrode-forming materials.

DETAILED DESCRIPTION OF THE INVENTION

Figure 1:
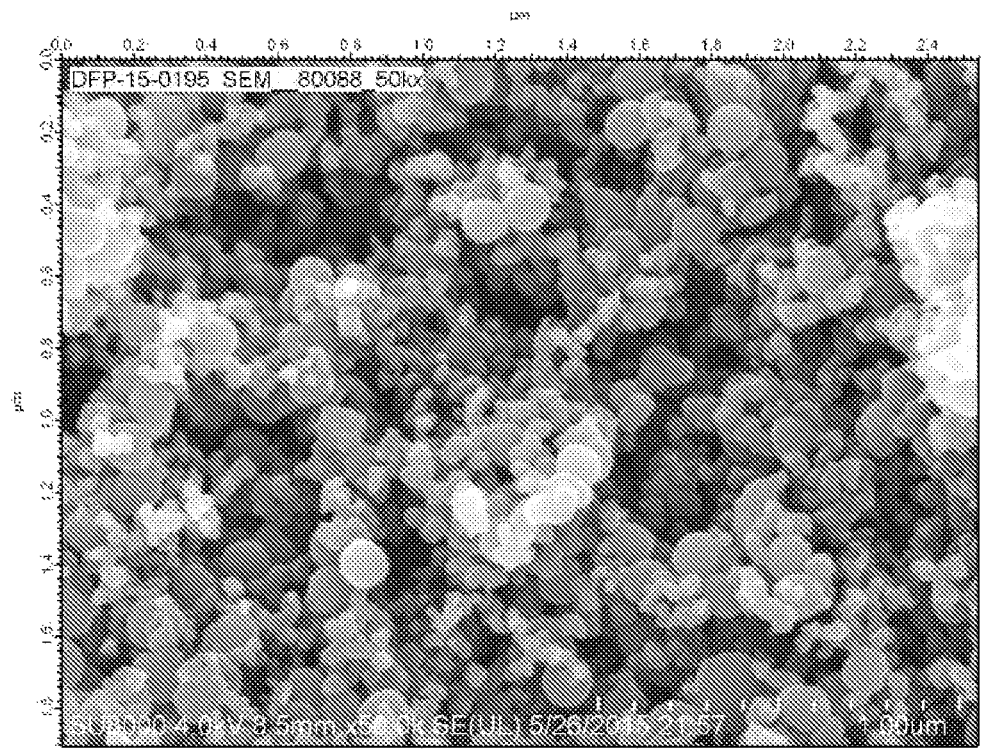
FIG. 1 is an SEM of the Example 1.

All references listed in this application are incorporated herein by reference. All percentages in a composition are weight percent, unless otherwise indicated, and all molecular weights are given as weight average molecular weight, unless stated otherwise.

Polymer Dispersion Binder

The polymer dispersion useful as a binder in the invention can be an aqueous dispersion of discrete particles of one or more polymers, preferably thermoplastic polymer particles.

Useful polymers include, but are not limited to fluoropolymers, SBR, ethylene vinyl acetate (EVA), acrylic polymers, polyurethanes, styrenic polymers, polyamides, polyesters, polycarbonate and thermoplastic polyurethane (TPU).

Preferably, the binder is a fluoropolymer. Useful fluoropolymers are thermoplastic homopolymers and copolymers having greater than 50 weight percent of fluoromonomer units by weight, preferably more than 65 weight percent, more preferably greater than 75 weight percent and most preferably grater than 90 weight percent of one or more fluoromonomers. Useful fluoromonomers for forming the fluoropolymer include but are not limited to: vinylidene fluoride (VDF or $VF_2$), tetrafluoroethylene (TEE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or per-fluorinated cyclic alkenes of $C_3$ and higher, and combinations thereof.

Especially preferred fluoropolymers are polyvinylidene fluoride (PV/DE) homopolymers, and copolymers, and polytetrafluroethylene (PTFE) homopolymers and copolymes. While the invention applies to all thermoplastic polymer, and in particular all fluoropolymers and copolymers, vinylidene fluoride polymers will be used to illustrate the invention, and are the preferred polymer.

In one embodiment, vinylidene fluoride copolymers are preferred, due to their lower crystallinity (or no crystallinity), making them more flexible than the semi-crystalline PVDF homopolymers. Flexibility of the binder provides advantages of a more flexible electrode that can better withstand the manufacturing process, as well as increased pull-through strength and better adhesion properties. Such copolymers include those containing at least 50 mole percent, preferably at least 75 mole %, more preferably at least 80 mole %, and even more preferably at least 85 mole % of vinylidene fluoride copolymerized with one or more comonomers selected from the group consisting of tetrafluoroethylene, trifluoroethylene, chlorotrifluoroethylene, hexafluoropropene, vinyl fluoride, pentafluoropropene, tetrafluoropropene, trifluoropropene, perfluoromethyl vinyl ether, perfluoropropyl vinyl ether and any other monomer that would readily copolymerize with vinylidene fluoride.

In one embodiment, up to 30%, preferably up to 25%, and more preferably up to 15% by weight of hexafluoropropene (HFP) units and 70% or greater, preferably 75% or greater, more preferably 85% or greater by weight or more of VDF units are present in the vinylidene fluoride polymer. It is desired that the HFP units be distributed as homogeneously as possible to provide PVDF-HFP copolymer with excellent dimensional stability in the end-use environment.

The PVDF for use in the electrode composition preferably has a high molecular weight. By high molecular weight, as used herein is meant PVDF having a melt viscosity of greater than 1.0 kilopoise, preferably greater than 5 Kpoise, more preferably greater than 10 Kpoise, and most preferably greater than 15 Kpoise, according to ASTM method D-3835 measured at 450° F. and 100 $sec^{-1}$.

The PVDF used in the invention is generally prepared by means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 120° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably the PVDF emulsion of the invention is fluorosurfactant free, with no fluorosurfactants being used in any part of the polymerization. Non-fluorinated surfactants useful in the PVDF polymerization could be both ionic and non-ionic in nature including, but are not limited to, 3-allyloxy-2-hydroxy-1-propane sulfonic acid salt, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The PVDF polymerization results in a latex generally having a solids level of 10 to 60 percent by weight, preferably 10 to 50 percent, and having a weight average particle size of less than 500 nm, preferably less than 400 nm, and more preferably less than 300 nm. The weight average particle size is generally at least 20 nm and preferably at least 50 nm. Additional adhesion promoters may also be added to improve the binding characteristics and provide connectivity that is non-reversible. A minor amount of one or more other water-miscible solvents, such as ethylene glycol, may be mixed into the PVDF latex to improve freeze-thaw stability.

Dry Active Powdery Electrode-Forming Materials

The aqueous binder dispersion, as part of an aqueous binder dispersion composition is added to one or more types of dry active powdery electrode-forming materials. The nature of the dry active powdery electrode-forming materials depends on whether the composition will be used to form a positive or a negative electrode. In the case of a positive electrode, the active electrode material may be an oxide, sulfide or hydroxide of lithium and a transition metal (including but not limited to cobalt, manganese, aluminum, titanium, or nickel, and iron phosphates, manganese phosphate). Double, and triple salts of lithium are also contemplated. Preferred positive electrode materials include, but are not limited to, $LiCoO_2$, $LiNi_xCo_{1-x}O_2$, $LiMn_2O_2$, $LiNiO_2$, $LiFePO_4$, $LiNi_xCo_yMn_zO_m$, $LiNi_xMn_yAl_zO_m$ where $x+y+z=1$ and m is an integer representing the number of oxygen atom in the oxide to provide an electron-balanced molecule; as well as lithium-metal oxides such as lithium cobalt oxide, lithium iron phosphate, lithium manganese phosphate, lithium-nickel oxide, and lithium-manganese oxide.

In the case of a negative electrode, the active material is generally a carbonaceous material, nano-titanate, or other matrix capable of being doped with lithium ions. Useful carbonaceous materials include, but are not limited to graphite, manmade graphite, carbon, carbon black, activated carbon, acetylene black, phenolic resin, pitch, tar, etc. In the present invention carbon fibers can also be used.

The ratio of PVDF solids to dry active powdery electrode-forming materials is from 0.5-25, parts by weight of PVDF solids to 75 to 99.5 parts by weight powdery electrode material, preferably from 0.5-15, parts by weight of PVDF solids to 85 to 99.5 parts by weight powdery electrode material, more preferably from 1-10 parts by weight of PVDF solids to 90 to 99 parts by weight powdery electrode material, and in one embodiment from 2-8, parts by weight of PVDF solids to 92 to 98 parts by weight powdery electrode material. If less PVDF is used, complete interconnectivity may not be achieved, and if more PVDF is used, there is a reduction in conductivity, and also the composition takes up volume and adds weight—and one use of the composition is for very small and light batteries.

Aqueous Polymer Binder Composition

The aqueous fluoropolymer binder dispersion of the invention may optionally be combined with one or more additives to form an aqueous fluoropolymer binder dispersion composition, prior to being added to the dry active powdery electrode-forming materials. These optional additives include, but are not limited to surfactants, anti-settling agents, wetting agents, thickeners, rheology modifiers, fugitive adhesion promoters, fillers, anti-foaming agents, pH buffers, and other adjuvants typically used in waterborne formulation while meeting desired electrode requirements.

Surfactant/Anti-Settling Agent

The fluoropolymer dispersion composition of the invention contains 0 to 10 parts, preferably from 0.1 to 10 parts, and more preferably 0.5 to 5 parts of one or more anti-settling agents and/or surfactants per 100 parts of water. In one embodiment the level of anti-settling agent or surfactant is from 2.7 to 10 parts per 100 parts of water. These anti-settling agents or surfactants are added to the PVDF dispersion post-polymerization, generally to improve the shelf stability, and provide additional stabilization during slurry preparation. Also during the polymerization process, the surfactant/anti-settling agent used in this invention could be added all upfront prior to polymerization, fed continuously during the polymerization, fed partly before and then during polymerization, or fed after polymerization started and progressed for a while.

Useful anti-settling agents include, but are not limited to, ionic substances, such as salts of alkyl sulfates, sulfonates, phosphates, phophonates (such as sodium lauryl sulfate and ammonium lauryl sulfate) and salts of partially fluorinated alkyl sulfates, carboxylates, phosphates, phosphonates (such as those sold under the CAPSTONE brandname by DuPont), and non-ionic surfactants such as the TRITON X series (from Dow) and PLURONIC series (from BASF). In one embodiment, only anionic surfactants are used. It is preferred that no fluorinated surfactants are present in the composition, either residual surfactant from the polymerization process, or added post-polymerization in forming or concentrating an aqueous dispersion.

Wetting Agent

The fluoropolymer composition of the invention optionally contains 0 to 5 parts, preferably from 0 to 3 parts of one or more wetting agents per 100 parts of water. Surfactants can serve as wetting agents, but wetting agents may also include non-surfactants. In some embodiments, the wetting agent can be an organic solvent. It has been found that the presence of optional wetting agents permits uniform dispersion of powdery electrode material(s) into aqueous dispersion of vinylidene fluoride polymer. Some electrode materials, such as carbonaceous materials will not disperse in an aqueous dispersion without the use of wetting agent. Useful wetting agents include, but are not limited to, ionic and non-ionic surfactants such as the TRITON series (from Dow) and the PLURONIC series (from BASF), and organic liquids that are compatible with the aqueous dispersion, including but not limited to NMP, DMSO, and acetone.

Thickener/Rheology Modifier

The fluoropolymer composition of the invention may contain 0 to 10 parts, preferably from 0 to 5 parts of one or more thickeners or rheology modifiers per 100 parts of water. Addition of water-soluble thickener or rheology modifier to the above dispersion prevents or slows down the settling of powdery electrode materials while providing appropriate slurry viscosity for a casting process. Useful thickeners include, but are not limited to the ACRYSOL series (from Dow Chemical); partially neutralized poly (acrylic acid) or poly (methacrylic acid) such as CARBOPOL from Lubrizol; and carboxylated alkyl cellulose, such as carboxylated methyl cellulose (CMC). Adjustment of the formulation pH can improve the effectiveness of some of the thickeners. In addition to organic rheology modifiers, inorganic rheology modifiers can also be used alone or in combination. Useful inorganic rheology modifiers include, but are not limited to, inorganic rheology modifiers including but not limited to natural clays such as montmorillonite and bentonite, manmade clays such as laponite, and others such as silica, and talc.

Fugitive Adhesion Promoter

A fugitive adhesion promoter is optionally added to aid in interconnectivity of the active powdery electrode-forming materials in electrodes formed from the process of the invention. By "fugitive adhesion promoter" as used herein is meant an agent that increases the interconnectivity of the active particles after being applied to an electroconductive substrate. The fugitive adhesion promoter is then capable of being removed from the formed electrode generally by evaporation (for a chemical) or by dissipation (for added energy).

The fugitive adhesion promoter can be a chemical material, an energy source combined with pressure, or a combination, used at an effective amount to cause interconnectivity of the components of the aqueous composition during formation of the electrode. For chemical fugitive adhesion promoters, the composition contains 0 to 150 parts, preferably 1 to 100 parts, and more preferably from 2 to 30 parts, of one or more fugitive adhesion promoters per 100 parts of water. Preferably this is an organic liquid, that is soluble or miscible in water. This organic liquid acts as a plasticizer for PVDF particles, making them tacky and capable of acting as discrete adhesion points during the drying step. The PVDF polymer particles are able to soften, flow and adhere to powdery materials during manufacture, resulting in electrodes with high connectivity that are non-reversible. In one embodiment the organic liquid is a latent solvent, which is a solvent that does not dissolve or substantially swell PVDF resin at room temperature, but will solvate the PVDF resin at elevated temperatures. In one embodiment a useful organic solvent is N-methyl-2-pyrrolidone. Other useful fugitive adhesion promoter agents include, but are not limited to, dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea.

In the case of energy as the fugitive adhesion promoter, useful energy sources include, but are not limited to, heat, IR radiation, and radio frequency (RF). For heat alone, the temperature during the processing of the PVDF composition on an electrode should be about 20 to 50° C. above the melting point of the polymer. When energy alone is used as the fugitive adhesion promoter, it is preferred that the heat is combined with pressure—such as a calendering step, for good interconnectivity.

The aqueous fluoropolymer composition may be diluted, as needed, to optimize processing. Higher solids composition are preferred, as less water must be removed in the process, yet a certain viscosity is required to optimize the dispersion flow rate when being added to the dry active powdery electrode-forming materials.

Electroconductive Substrate:

Once the binder/active electrode particle blend is formed, it is applied to an electroconductive substrate to form an electrode. The electroconductive substrate is generally thin, and usually consists of a foil, mesh or net of a metal, such as aluminum, copper, lithium, iron, stainless steel, nickel, titanium, or silver.

Process

Dry electrode processing is attractive because it eliminates solvents and related equipment and processing cost, thereby can significantly reduce overall battery cost. One challenge in dry electrode processing is to achieve uniform dispersion of carbon and binder particles in the solid mixture. Prior art blends PVDF based binder powder into carbon or carbon/active material mixture. PVDF based binder powders consists of agglomerate of primary particles. The agglomerate structure cannot be easily dispersed into individual primary particles using normal dry process for powder mixing/dispersing. The agglomerates prevent intimate contact between primary binder particles and carbon/active materials, and reduce the efficiency/utilization of binder.

To archive optimal dispersion of binder particles, the present invention involves spraying binder latex into dry carbon and/or active material. Because binder exists as individual primary particles in latex, our method will cause intimate contact between binder primary particles, carbon and/or active material.

One of ordinary skill in the art can envision several ways in which the aqueous binder dispersion can be combined with the dry active powdery electrode-forming materials, to form a uniform blend, based on the following non-limiting examples.

In one embodiment, the dry active powdery electrode-forming materials are placed into a high shear mixer, such as a jet-mill or a Henschel mixer, and mixing begun. The fluoropolymer dispersion can then be added at a slow rate in to the dry powdery material with in few minutes to several hours time frame depending on volume and speed of mixing in the vessel, forming a uniform damp blend.

In another embodiment, the dry active electrode powder particles can be spread out and the binder dispersion atomized or sprayed onto the powder. A uniform distribution of the dispersion can be aided by agitation of the sprayed powder by the use of tumblers. It is important for the polymer dispersion to be shear stable, in order to maintain integrity during a pray application. Shear stability can be obtained by different means as known in the art, including the use of additives described previously.

The binder/dry active powdery electrode-forming materials blend of the invention can be applied to one or both sides of an electroconductive substrate by means known in the art. In one embodiment the blend is formed into a film by powder spraying or casting, and the film adhered to the electroondutive substrate, using an adhesive, as known in the art.

In another embodiment, the blend is deposited directly onto the electroconductive substrate, and pressed onto the substrate by a means such as calendaring. The electroconductive substrate/blend composite may be heated to aid in the pressing process.

Uses

The electrodes formed by the method of the invention can be used to form electro-chemical devices, including but not limited to batteries, capacitors, and other energy storage devices.

EXAMPLES

General:

The latexes of the invention are prepared by a typical process for making fluoropolymers using emulsifiers. The emulsifiers may be ionic or non-ionic, such as those containing blocks of polyethylene glycol, polypropylene glycol and/or polytetramethylene glycol. Preferably, the process and fluoropolymer produced contain no fluorinated or partially fluorinated surfactant. The fluoropolymer dispersions produced have good latex stability and shelf-life, and are coagulum-free. These preferred dispersions are absolutely free of fluorinated or partially fluorinated surfactant—with no fluorinated surfactant being used in either the synthesis or in a post-addition.

In the polymerization process, the emulsifier may be added all upfront prior to polymerization, fed continuously during the polymerization, fed partly before and then during polymerization, or fed after polymerization started and progressed for a while.

Example 1

Into an 80-gallon stainless steel reactor was charged, 345 lbs of deionized water, 250 grams of PLURONIC 31R1 (non-fluorinated non-ionic surfactant from BASF), and 0.3 lbs of propane. Following evacuation, agitation was begun at 23 rpm and the reactor was heated. After reactor temperature reached the desired set point of 100° C., the VDF charge was started. Reactor pressure was then raised to 650 psi by charging approximately 35 lbs VDF into the reactor. After reactor pressure was stabilized, 4.5 lbs of initiator solution made of 1.0 wt % potassium persulfate and 1.0 wt % sodium acetate was added to the reactor to initiate polymerization. The rate of further addition of the initiator solution was adjusted to obtain and maintain a final VDF polymerization rate of roughly 70 pounds per hour. The VDF homopolymerization was continued until approximately 150 pounds VDF was introduced in the reaction mass. The VDF feed was stopped and the batch was allowed to react-out at the reaction temperature to consume residual monomer at decreasing pressure. After 25 minutes, the agitation was stopped and the reactor was cooled, vented and the latex recovered. Solids in the recovered latex were determined by gravimetric technique and were about 27 weight % and melt viscosity of about 27 kp according to ASTM method D-3835 measured at 450° F. and 100 sec$^{-1}$. The melting temperature of resin was measured in accordance with ASTM method D-3418 and was found to be about 162° C. The weight average particle size was measured by NICOMP laser light scattering instrument and was found to be about 150 nm.

Example 2

Into an 80-gallon stainless steel reactor was charged, 345 lbs of deionized water, 250 grams of PLURONIC 31R1 (non-fluorinated non-ionic surfactant from BASF), and 0.6 lbs of ethyl acetate. Following evacuation, agitation was begun at 23 rpm and the reactor was heated. After reactor temperature reached the desired set point of 100° C., the VDF and HFP monomer were introduced to reactor with HFP ratio of 40 wt % of total monomers. Reactor pressure was then raised to 650 psi by charging approximately 35 lbs total monomers into the reactor. After reactor pressure was stabilized, 5.0 lbs of initiator solution made of 1.0 wt % potassium persulfate and 1.0 wt % sodium acetate were added to the reactor to initiate polymerization. Upon initiation, the ratio of HFP to VDF was so adjusted to arrive at 16.5% HFP to total monomers in the feed. The rate of further addition of the initiator solution was also adjusted to obtain and maintain a final combined VDF and HFP polymerization rate of roughly 70 pounds per hour. The VDF and HPF copolymerization was continued until approximately 160 pounds monomers were introduced in the reaction mass. The HFP feed was stopped but VDF feed continued till approximately 180 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 32 weight % and melt viscosity of about 28 kp according to ASTM method D-3835 measured at 450° F. and 100 sec$^{-1}$. The melting temperature of resin was measured in accordance with ASTMD3418 and was found to be about 120° C. The weight average particle size was measured by NICOMP laser light scattering instrument and was found to be about 160 nm.

Examples 3

Into an 80-gallon stainless steel reactor was charged, 345 lbs of deionized water, 250 grams of PLURONIC 31R1 (non-fluorinated non-ionic surfactant from BASF), and 0.35 lbs of ethyl acetate. Following evacuation, agitation was begun at 23 rpm and the reactor was heated. After reactor temperature reached the desired set point of 100° C., the VDF and HFP monomer were introduced to reactor with HFP ratio of 13.2 wt % of total monomers. Reactor pressure was then raised to 650 psi by charging approximately 35 lbs total monomers into the reactor. After reactor pressure was stabilized, 3.5 lbs of initiator solution made of 1.0 wt % potassium persulfate and 1.0 wt % sodium acetate were added to the reactor to initiate polymerization. Upon initiation, the ratio of HFP to VDF was so adjusted to arrive at 4.4% HFP to total monomers in the feed. The rate of further addition of the initiator solution was also adjusted to obtain and maintain a final combined VDF and HFP polymerization rate of roughly 90 pounds per hour. The VDF and HPF copolymerization was continued until approximately 160 pounds monomers were introduced in the reaction mass. The HFP feed was stopped but VDF feed continued till approximately 180 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 32 weight % and melt viscosity of about 38 kp according to ASTM method D-3835 measured at 450° F. and 100 sec$^{-1}$. The melting temperature of resin was measured in accordance with ASTM method D-3418 and was found to be about 152° C. The weight average particle size was measured by NICOMP laser light scattering instrument and was found to be about 160 nm.

The above PVDF based latexes of example 1-3 were then formulated into an aqueous separator coating composition and applied to a separator and dried.

Dry Electrode Processing

To illustrate the advantage of the invention, the following tests/examples were conducted:

Example 4 Dispersion of Binder Latex Particles into Conductive Carbon 5.0 g of Kynar® LBG latex from Arkema Inc. (20% solids) is sprayed into 1.0 g conductive carbon (SuperP from Timcal) through an ultrasonic atomizer (VC50 by Sonics). The powder/latex mist is mixed by a magnetic stir bar at 180-240 rpm, during spraying. The moist mixture is dried in a vacuum oven at 60° C. for 2 hr. The dry mixture is then mixed in a centrifugal planetary mixer (Thinky) at 2000 rpm for 1 min with 5 mm zirconia beads as grinding media to break out the large crumbs. The dry powder mix morphology was observed by SEM. A typical SEM of the Example 4 sample is shown in FIG. 1. The ~130 nm spheres are binder particles while the ~40 nm particles are carbon. It is clear that binder is dispersed into primary particles, and is uniformly and intimately mixed with carbon particles.

Figure 2:
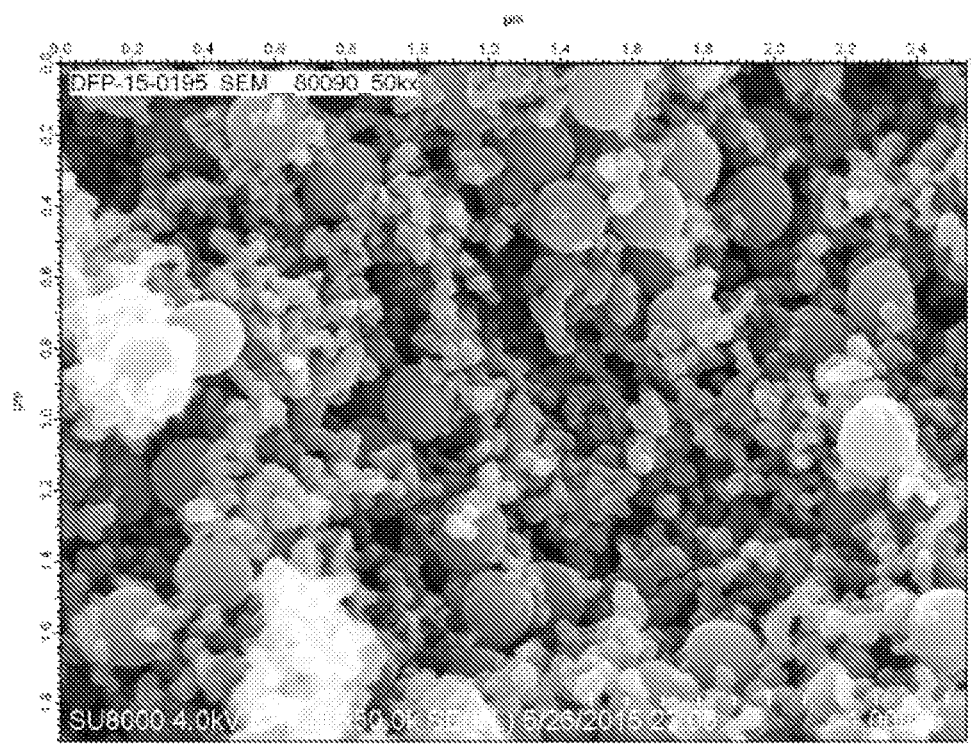
FIG. 2 is an SEM of the Example 2.

Example 5: Dispersion Binder Latex Particles into Conductive Carbon 5.0 g of latex of modified PVDF (20% solids) is sprayed into 1.0 g of conductive carbon (SuperP from Timcal) through an ultrasonic atomizer (VC50 by Sonics). The powder/latex mist is mixed by a magnetic stir bar at 180-240 rpm, during the spray. The moist mixture is dried in a vacuum oven at 60° C. for 2 hr. The dry mixture is then mixed in a centrifugal planetary mixer (Thinky) at 2000 rpm for 1 min with 5 mm of zirconia beads as a grinding media to break out the large crumbs. A typical SEM of Example 5 sample is shown in FIG. 2. The ~200 nm spheres are binder particles while the ~40 nm particles are carbon. It is clear that binder is dispersed into primary particles, and is uniformly and intimately mixed with carbon particles.

Figure 3A:
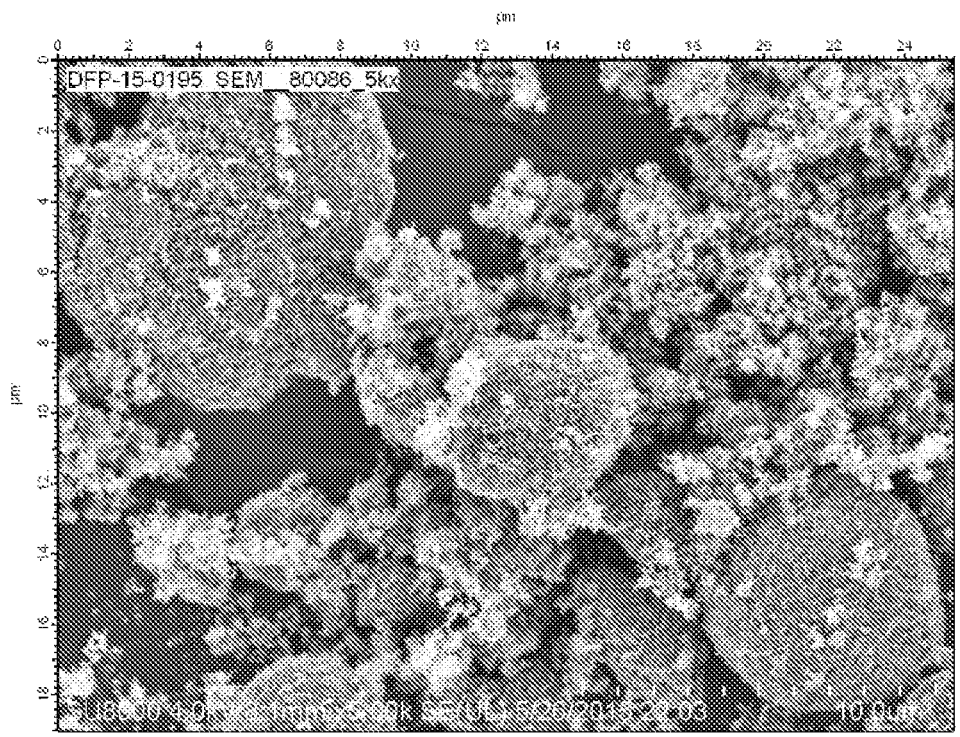
FIGS. 3a and 3b are SEMs of the Comparative Example 1
Figure 3B:
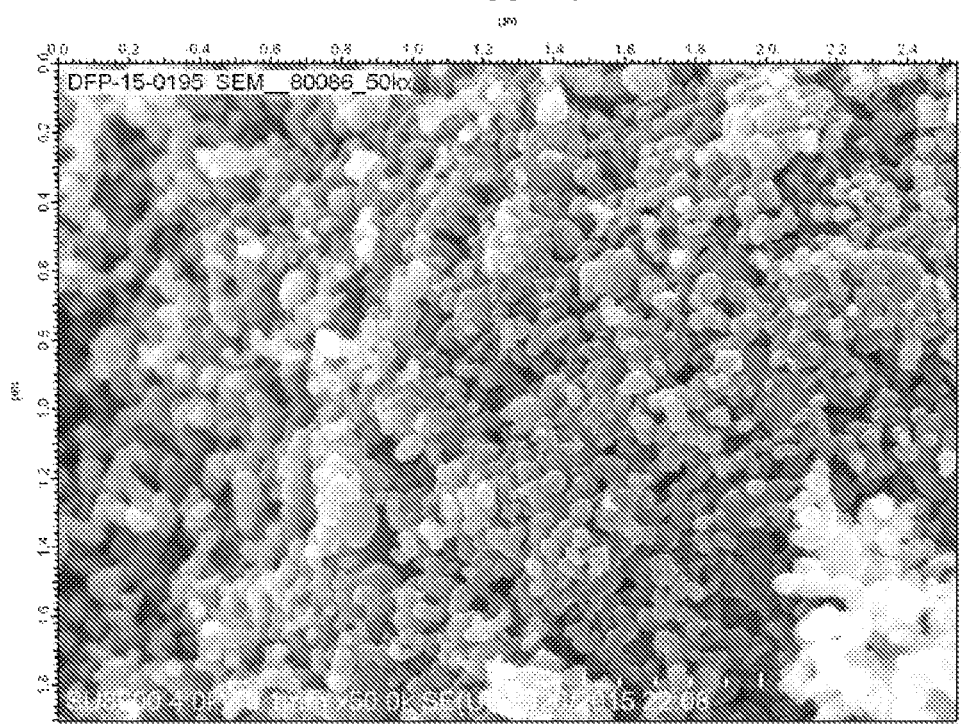

Comparative Example 1. Dry Blending of Conductive Carbon and Binder Powder 0.3 g conductive carbon (SuperP from Timcal) and 0.3 g of PVDF binder (KYNAR LBG) are mixed in a centrifugal planetary mixer (Thinky) at 2000 rpm for 2 min with 5 mm zirconia beads as a grinding media. The 1:1 ratio carbon to binder is chosen because it is typical in most cathode electrode composition. The dry powder mix morphology was observed by SEM. A typical SEM of comparative example 1 sample is shown in FIGS. 3a and 3b. FIG. 3a shows binder powders (3-10 um sized) coated with carbon particles (primary particles of ~40 nm). FIG. 3b shows high magnification on the surface of one coated composite, which is fully covered with carbon (structure with 40 nm primary particles), almost no binder particles (~130 nm) are visible.

Comparing FIG. 3b to examples of the present invention, as shown in FIGS. 1&2, one can see the mixture produced by the latex dispersion method of the invention shows uniform dispersion/mixing of carbon and binder primary particles, while dry power blending only coats the surface of the binder agglomerates and does not break the binder into primary particles.

Example 6. Dry Blended Cathode Mixture, Latex Spray Method of the Invention

Figure 4:
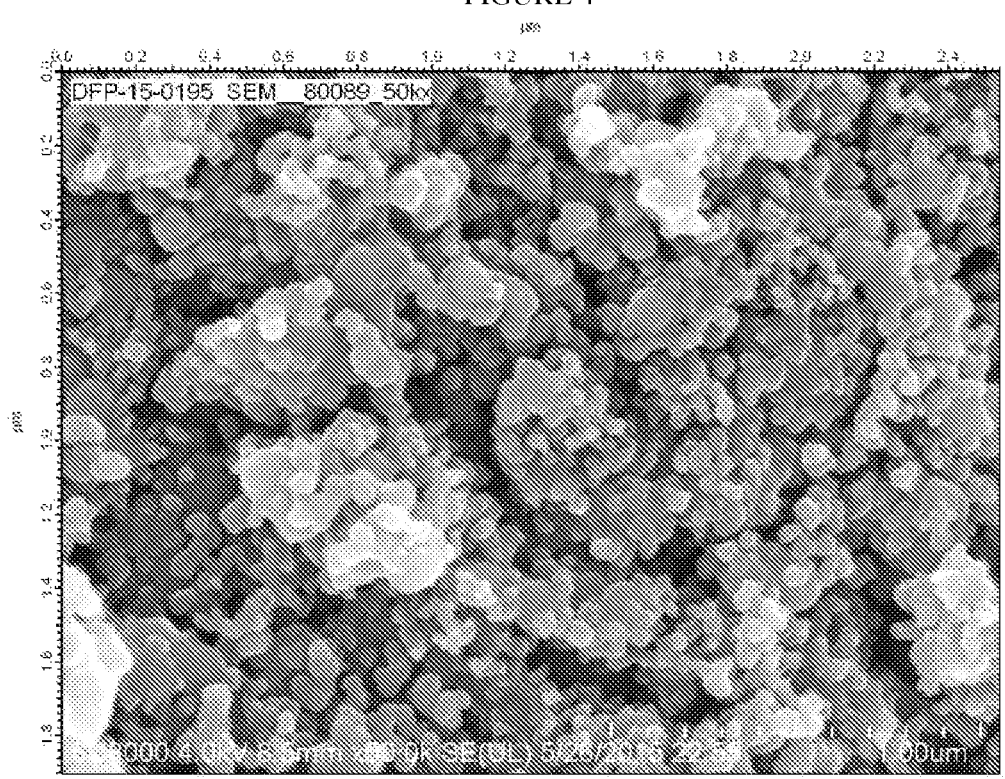
FIG. 4 is an SEM of the Example 6.

LCO (Umicore D10), Carbon (SuperP), and binder (Kynar LBG) at a ratio of 90:5:5 are used. 0.6 g carbon/binder mixture from Example 4 (latex spray method) and 5.4 g LCO was dry mixed by Thinky at 2000 rpm for 2 min A typical SEM of example 6 sample is shown in FIG. 4. The flat flake features are binders (deformed due to shear/heat during mixing with active material), while the ~40 nm particles are carbon. With the latex spray method, the majority of surface is binder flakes due to uniform distribution of carbon into the carbon/binder composite structure.

Comparative Example 2. Dry Blended Cathode Mixture, Method 1

Figure 5:
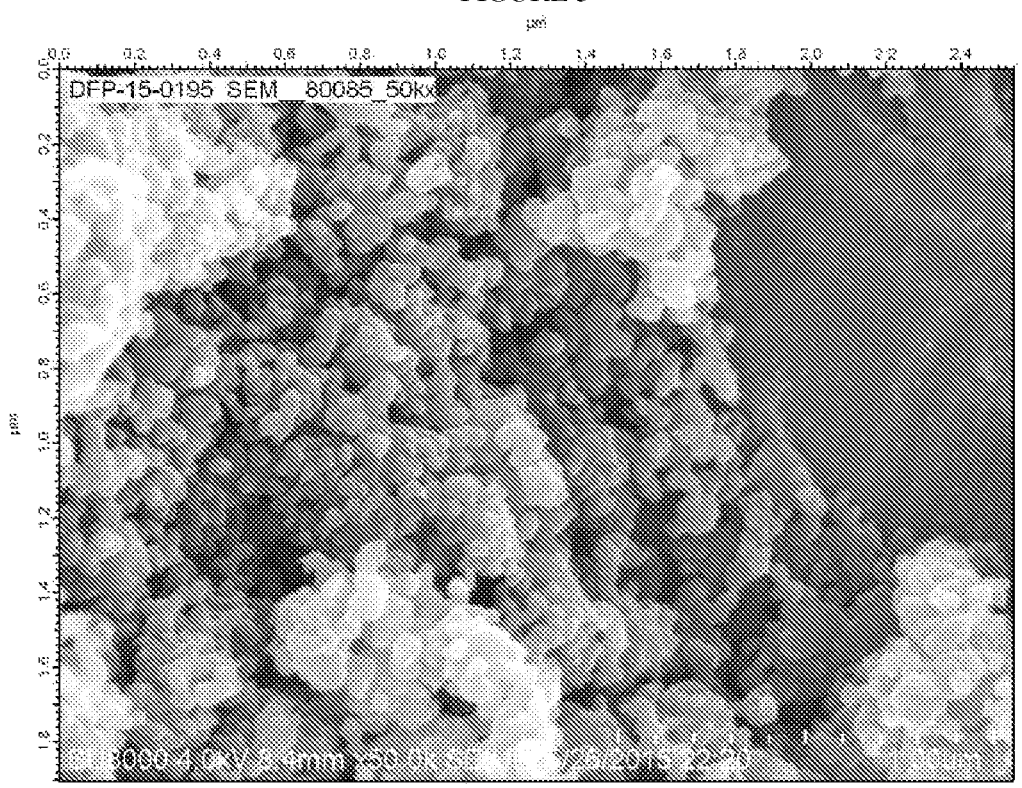
FIG. 5 is an SEM of the Comparative Example 2.

LCO (Umicore D10), Carbon (SuperP), and binder (Kynar LBG) at a ratio of 90:5:5 are used. 0.3 g carbon and 5.4 g LCO was first dry mixed by Thinky at 2000 rpm for 2 min, then 0.3 g binder powder is added and mixed at 2000 rpm for 2 min A typical SEM of comparative comparative example 2 is shown in FIG. 5. The flat flake feature are binders, while the ~40 nm particles are carbon. Majority of surface is carbon in the carbon/binder composite in this example.

Comparative Example 3. Dry Blended Cathode Mixture, Method 2

Figure 6:
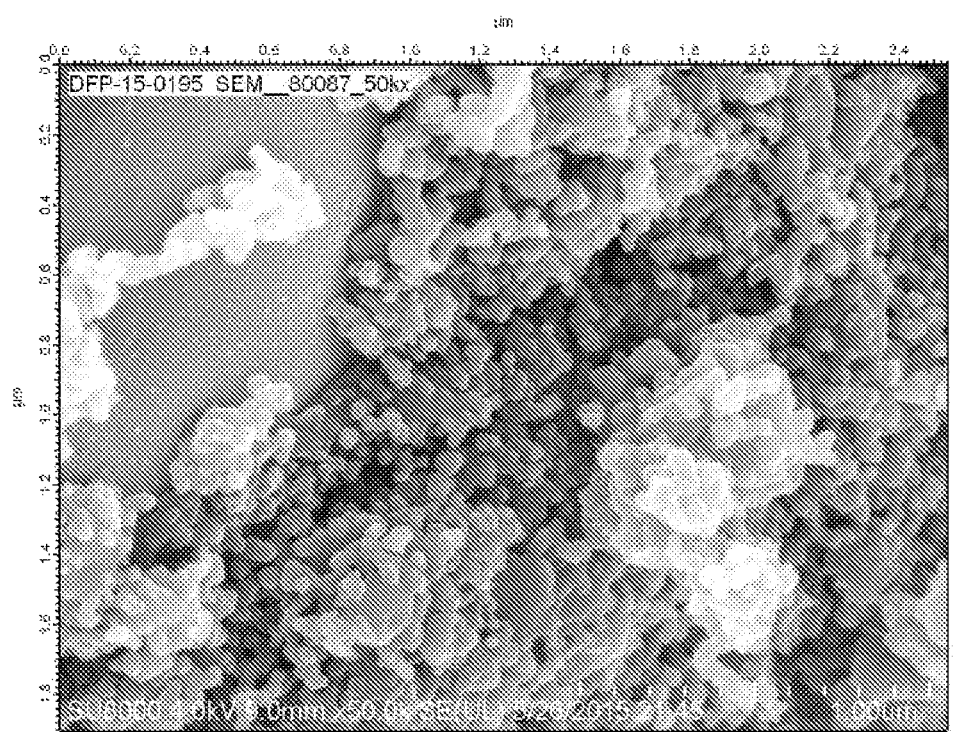
FIG. 6 is an SEM of the Comparative Example 3.

LCO (Umicore D10), Carbon (SuperP), and binder (Kynar LBG) at a ratio of 90:5:5 are used. 0.6 g carbon/binder mixture from Example 4 (dry powder blend method) and 5.4 g LCO was dry mixed by Thinky at 2000 rpm for 2 min. A typical SEM of comparative comparative Example 3 is shown in FIG. 6. The flat flake feature are binders, while the ~40 nm particles are carbon. Majority of surface is carbon in the carbon/binder composite.

Example 6 and Comparative Examples 2 and 3 compare electrode mixting by dry power blending, as shown in FIGS. 5 & 6 (comparative) to that by latex spray method of the invention in FIG. 4. The majority of exposed surface in comparative examples 2 and 3 are carbon particles, while in the case of the latex spray method of the invention, the majority of the surface is binder covered. This is due to the capability of disperse binder to form into individual primary particles, and be uniformly incorporated into the mixture. This increases binder utilization and ensures a well connected network of carbon, which will enhance battery electrode adhesion/cohesion, and electric performance.

Example 7 Fabrication of Electrode Using Dry Process

Using the dry blended electrode mixture in example 6, an electrode film can be made by established powder pressing techniques, such as by hydraulic flat press, or roll press, at room temperature or elevated temperatures. One example of using a roll press to produce electrode from dry powder blends was disclosed in U.S. Pat. No. 7,295,423, for capacitor application. The same process when applied for making a battery electrode from dry powder mixture, would be expected to form a working battery electrode.

What is claimed is:

1. A method for forming an energy storing device, comprising the steps of:
   a) forming an aqueous binder dispersion composition having discrete particles of one or more polymers;
   b) adding said aqueous binder dispersion to one or more types of dry active powdery electrode-forming materials to form a uniform damp solid blend,
   c) drying said uniform damp solid blend of binder and dry active powdery electrode-forming materials, and
   d) applying said uniform blend to at least one surface of an electroconductive substrate to form an electrode.

2. The method of claim 1, wherein said binder is selected from the group consisting of fluoropolymers, SBR, ethylene vinyl acetate (EVA), acrylic polymers, polyurethanes, styrenic polymers, polyamides, polyesters, polycarbonate and thermoplastic polyurethane (TPU).

3. The method of claim 2, wherein said binder comprises a fluoropolymer.

4. The method of claim 3, wherein said fluoropolymer comprises at least 50 weight percent of polyvinylidene fluoride homopolymer or copolymer.

5. The method of claim 3, wherein said fluoropolymer is a copolymer comprising from 5 to 30 weight percent of hexafluoropropene and 70 to 95 weight percent of vinylidene fluoride monomer units.

6. The method of claim 3, wherein the fluoropolymer has a melt viscosity of greater than 5 Kpoise, according to ASTM method D-3835 measured at 450° F. and 100 $sec^{-1}$.

7. The method of claim 6, wherein the fluoropolymer has a melt viscosity of greater than 15 Kpoise, according to ASTM method D-3835 measured at 450° F. and 100 $sec^{-1}$.

8. The method of claim 1, wherein said aqueous binder dispersion composition, comprises the polymer binder and one or more additives selected from the group consisting of surfactants, anti-settling agents, wetting agents, thickeners, rheology modifiers, fugitive adhesion promoters, fillers, anti-foaming agents, pH buffers.

9. The method of claim 1, wherein said dry active powdery electrode-forming materials are selected from the group consisting of an oxide, sulfide or hydroxide of lithium and a transition metal; carbonaceous materials; and nanotitanates.

10. The method of claim 1, further comprising the step of forming an energy storage device using said electrode.

11. An electrode formed by the process of claim 1.

12. A dry blend comprising a fluoropolymer binder and active powdery electrode-forming materials, wherein said fluoropolymer binder exists at least 75 percent by weight as single binder particles, said single binder particles having a weight average particle size of less than 500 nm.

13. Said dry blend of claim 12, wherein said single polymer particles have a weight average particle size of from 20 to 400 nm.

14. Said dry blend of claim 13, wherein said single polymer particles have a weight average particle size of from 50 to 300 nm.

15. A method for forming an energy storing device, comprising the steps of:
   a) forming an aqueous binder dispersion composition having discrete particles of one or more polymers;

b) spraying said aqueous binder dispersion onto carbon or activated carbon to form a uniform damp blend, and c) applying said uniform blend to at least one surface of an electroconductive substrate to form an electrode.

* * * * *